United States Patent [19]
Shimogawa et al.

[11] 4,371,127
[45] Feb. 1, 1983

[54] SEAT BELT LOCKING DEVICE

[75] Inventors: Toshiaki Shimogawa, Aichi; Takayuki Ando, Okazaki; Satosi Kuwakado, Aichi, all of Japan

[73] Assignee: Nippon Soken, Inc., Nishio, Japan

[21] Appl. No.: 238,953

[22] Filed: Feb. 27, 1981

[30] Foreign Application Priority Data

Mar. 4, 1980 [JP] Japan ................................ 55-27163

[51] Int. Cl.³ ...................... A62B 35/02; B65H 75/48
[52] U.S. Cl. ................................ 242/107.2; 188/65.4; 280/808
[58] Field of Search ............................ 242/107.2, 107.3, 107.4 R–107.4 E; 280/801, 803, 806–808; 297/468–480; 188/65.1, 65.4, 65.5

[56] References Cited

U.S. PATENT DOCUMENTS 3,664,598  5/1972  Sherman ........................ 242/107.3
3,817,473  6/1974  Board et al. ............. 242/107.4 R X
4,249,708  2/1981  Asano ...................... 242/107.4 A X
4,253,621  3/1981  Seel ............................ 242/107.4 A Primary Examiner—John M. Jillions
Attorney, Agent, or Firm—Cushman, Darby & Cushman

[57] ABSTRACT

A seat belt locking device to be installed in a seat belt system of a vehicle together with an emergency lock retractor comprises a stationary first roller, a second roller which is movable toward the first roller due to a predetermined load of the seat belt stretched along the first roller and the second roller, a roller locking means which locks the second roller when the seat belt is strongly caught between the first roller and the second roller and a load limiting means which unlocks the roller locking means when the load of the seat belt reaches a predetermined value.

7 Claims, 7 Drawing Figures

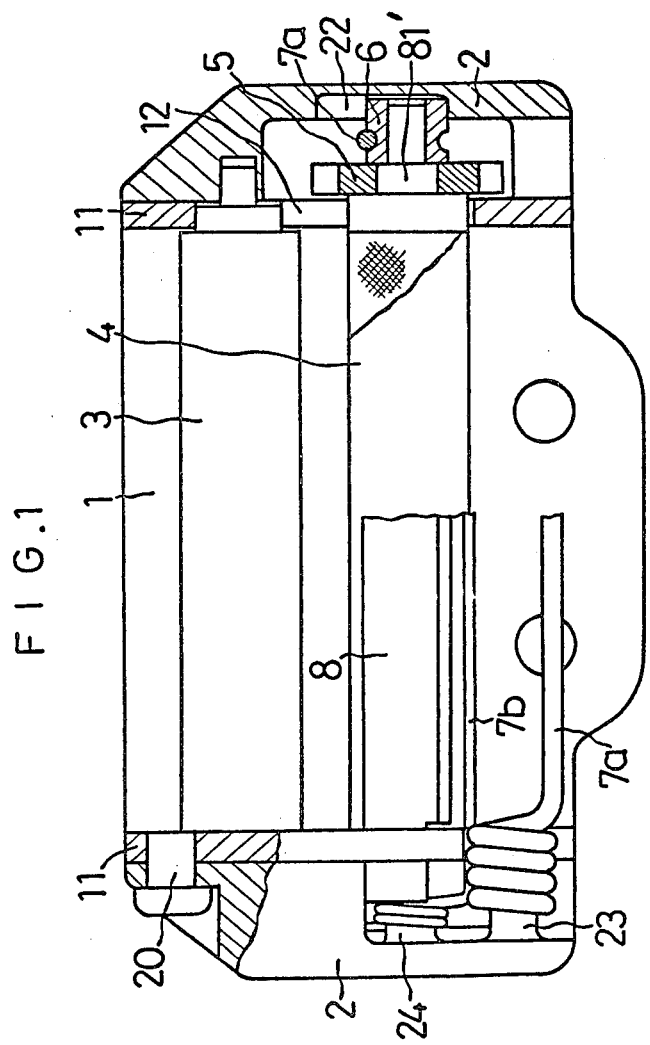

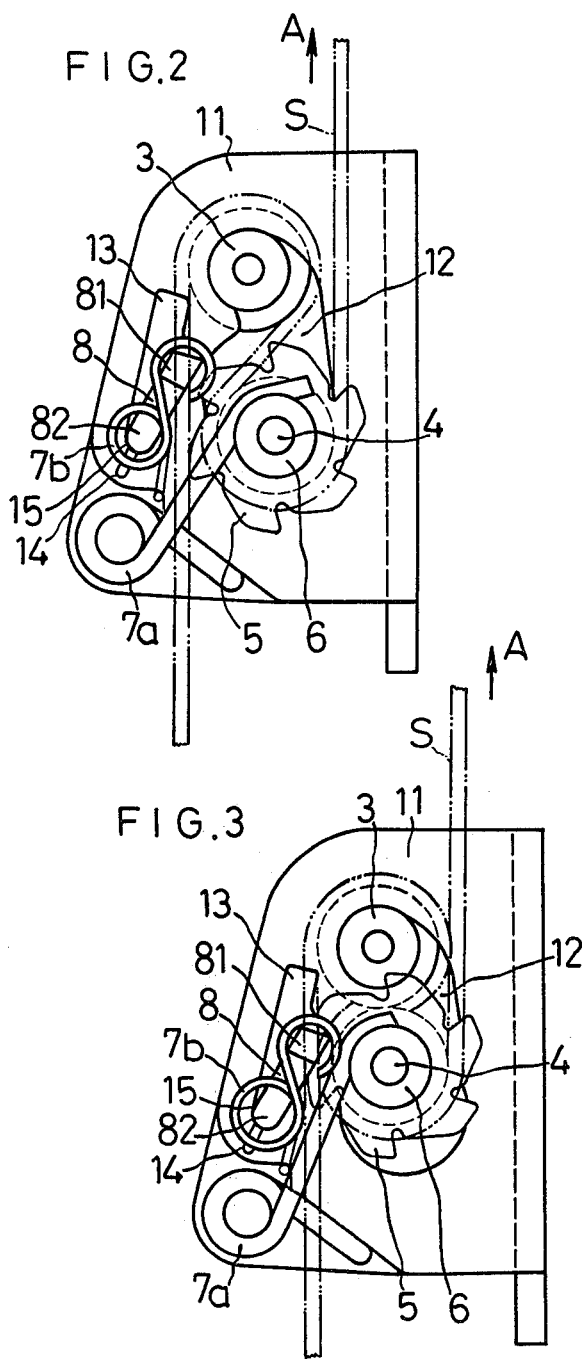

SEAT BELT LOCKING DEVICE

BACKGROUND OF THE INVENTION

The present invention relates to a seat belt locking device, particularly to a seat belt locking device which is installed in a seat belt system of a vehicle together with an emergency lock retractor.

The seat belt system for restraining the occupant of a vehicle is generally provided with an emergency lock retractor by which the seat belt is wound upon or withdrawn according as the physique and the motion of the occupant and by which the seat belt is prevented from being extended at an emergency time such as upon impact of the vehicle.

In a locking mechanism of the lock retractor of this type, the seat belt is usually wound upon a reel which is rotatably supported by the emergency lock retractor and at an emergency time, the seat belt is prevented from being withdrawn from the reel by locking the rotation of the reel by means of a ratchet gear.

Various means have been adopted for operating the ratchet gear at an emergency time such as upon a vehicle impact. And by any of the above described means, the rotation of the reel upon which the seat belt is wound is stopped.

Therefore, when high load of the occupant is applied to the seat belt at an emergency time such as upon a vehicle impact, the seat belt portion which is wound upon the locked reel is tightened and extended out of the reel by a length corresponding to the tightened seat belt portion. And also the seat belt itself stretches due to the high load so that the occupant is in danger of moving forward largely.

In order to prevent the seat belt from being extended out of the retractor after the rotation of the reel is stopped, a locking device which locks the seat belt itself when the reel of the retractor is locked has been conventionally provided in the emergency lock retractor.

One example of the above described locking device locks the seat belt by catching the seat belt between rollers or between a roller and a plate. And in most cases, knurling is formed in the belt catching surfaces of the roller and the like in order to increase the friction force of the belt catching portion.

As a result, according to one example of the conventional locking device, the belt catching force becomes large but the seat belt becomes easy to be broken.

When the seat belt is broken, the occupant is utterly released from the restraint of the seat belt so that the seat belt cannot fulfil its function.

Accordingly, one object of the present invention is to provide a seat belt locking device which surely locks the seat belt itself on the side that the seat belt is withdrawn from the emergency lock retractor when the reel of the emergency lock retractor is locked.

Another object of the present invention is to provide a seat belt locking device having a means which prevents the seat belt from being broken.

DESCRIPTION OF THE DRAWINGS

Other objects and advantages of the invention will become apparent from the following description of embodiments with reference to the accompanying drawings wherein:

FIG. 1 to FIG. 4 show a first embodiment of the present invention;

FIG. 1 is a partially cut away front view of a seat belt locking device of the first embodiment;

FIG. 2 is a side view of a seat belt locking device of the first embodiment of which cover member is removed;

FIG. 3 is a side view of the first embodiment under operation;

FIG. 4 is an enlarged sectional view of a main part of the first embodiment when the lock is released;

SUMMARY OF THE INVENTION

Figure 4:
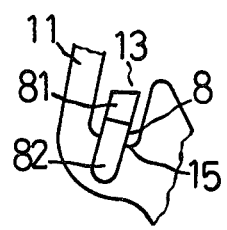

The seat belt locking device of the present invention comprises a stationary first roller, and a second roller which is movable toward the first roller. The seat belt is stretched along these rollers.

When the load of the occupant is applied to the seat belt at an emergency time, the second roller moves toward the first roller to strongly catch the seat belt therebetween.

The seat belt locking device of the present invention is further provided with a roller locking means which prevents the second roller catching the seat belt together with the first roller from rotating forwardly and backwardly. By providing the roller locking means in the seat belt locking device, the seat belt can be surely locked.

Furthermore, according to the present invention, the roller locking means or its supporting members is formed so as to be broken or deformed when the load of the occupant applied to the seat belt reaches a predetermined value, as the load limiting means.

When the load limiting means is broken or damaged due to excessively high load, the locking operation of the roller locking means is released to prevent the seat belt from being broken.

DESCRIPTION OF THE PRESENT INVENTION

Hereinafter, the present invention will be explained in accordance with embodiments with reference to the drawings.

FIG. 1 to FIG. 4 show a first embodiment of the present invention.

As shown in FIG. 1, a frame 1 is attached within a vehicle. Between side plates 11 which are opposed to each other, a first roller 3 and a second roller 4 are disposed. And in the surface of the second roller 4, knurling is formed.

To each side surface of the side plates 11, a cover member 2 is fixed by means of a bolt 20.

Both side portions of the seat belt locking device of the first embodiment have the same construction as each other. Both side portions of FIG. 1 show different cross sections from each other respectively.

In both side plates 11, curved guide holes 12 are formed so as to be opposed to each other.

The first roller 3 is positioned in the upper end of the curved guide holes 12 and both ends of the first roller 3 are rotatably supported by the cover members 2.

Both end portions 81' of the second roller 4 are formed into a rectangular cross section respectively, and sawtoothed ratchet gears 5 are fixed to the end portions 81' respectively.

And both ends of the second roller 4 are rotatably inserted into cylindrical guide members 6 respectively.

In the cover members 2, guide holes 22 are formed so as to be opposed to the curved guide holes 12 of the side plates 11. The ends of the guide members 6 are disposed within the guide holes 22 so as to be moved therealong.

A spring 7a is provided along the second roller 4. The central straight portion of the spring 7a is engaged with the frame 1 at a position lower than the curved guide holes 12 and the coil-shaped end portions thereof are journalled by boss portions 23 of the cover members 2. And each end of the spring 7a is secured to each guide member 6.

The guide members 6 and the second roller 4 are usually pushed downwards in the direction opposite to the first roller 3 by means of the spring 7a. And the guide members 6 are also pressed to the bottom portions of the curved guide holes 12. At this time, the second roller 4 is retained spaced from the first roller 3 in parallel therewith.

In each side plate 11, a long hole 13 is formed in front of the curved guide hole 12 so as to be continued therefrom and a lock plate 8 is inserted in the long hole 13. The bottom portion 82 of each end of the lock plate 8 is rotatably fitted in the bottom portion 15 of each long hole 13. The top portion of each end of the lock plate 8 is formed into a pawl portion 81. And springs 7b are provided along the lock plates 8 respectively.

The central portion of the spring 7b is formed straight and both ends of the spring 7b are formed like a coil respectively and are journalled by boss portions 24 of the cover members 2. And each end of the spring 7b is engaged with each pawl portion 81.

By the spring 7b having the above described structure, clockwise rotating force is always applied to the lock plate 8 in FIG. 2 and the lock plate 8 is usually pressed to the bottom portions 15 of the long holes 13.

At this time, each pawl portion 81 of the lock plate 8 is opposed to the tooth of each ratchet gear 5 which is provided in each end of the second roller 4, at a small distance therefrom.

In each side plate 11, a narrow hole 14 is formed from the bottom portion 15 of the long hole 13 in the direction of the extension of the lock plate 8.

When a predetermined load which is slightly smaller than the seat belt breaking load, is applied to the lock plate 8, the bottom portion 82 of the lock plate 8 deforms the narrow holes 14 and projects thereinto.

The load limiting means is thus constructed by the lock plate 8 and the narrow holes 14.

The seat belt S which is led out of the reel of the emergency lock retractor (not shown) is stretched along the stationary first roller 3 and the movable second roller 4 in a letter S-shaped condition, then is led into the direction of the first roller 3. And the seat belt is connected to a tongue plate and anchor means (not shown).

Thus, the seat belt system is constructed.

Hereinafter, the operation of the seat belt locking device of the first embodiment will be explained in accordance with FIG. 2 to FIG. 4.

The seat belt S which is stretched along the first roller 3 and the second roller 4 is wound upon or withdrawn from the reel of the emergency lock retractor according to the motion of the occupant. At this time, the first roller 3 and the second roller 4 rotate according as the movement of the seat belt S.

Upon a vehicle impact, the reel of the emergency lock retractor is locked and is prevented from rotating in the seat belt withdrawing direction. And load of the occupant is applied to the seat belt S in the direction of the arrow A. To the second roller 4 along which the seat belt is stretched in a letter S shape, tension force is applied so as to make the distance between the first roller 3 and the second roller 4 shorter.

When the load of the occupant exceeds a predetermined value, the second roller 4 moves toward the first roller 3 guided by the guide holes 12, overcoming the pushing force of the spring 7a.

At this time, the back side of the tooth of each ratchet gear 5 is contacted with each pawl portion 81 of the lock plate 8 but each ratchet gear 5 overcomes the pushing force of the spring 7b and moves toward the first roller 3, pushing away each pawl portion 81.

When the second roller 4 moves toward the first roller 3 to strongly catch the seat belt S therebetween, and the seat belt S starts to be pulled toward the occupant, the tooth of each ratchet gear 5 is engaged with each pawl portion 81 of the lock plate 8 and the second roller 4 is prevented from rotating counterclockwise and moving backwards.

As a result, the seat belt S is strongly and compressively sandwiched between the rollers 3 and 4, and the seat belt S is prevented from being extended from the locking device of the present invention completely due to the friction generated between the seat belt S and the surface of the unrotated second roller 4 and that generated between the seat belt portions which are contacted with each other and moved in the opposite directions to each other.

When the load of the occupant applied to the seat belt S is increased so that the seat belt portion which is strongly caught by the rollers 3 and 4 approaches its breaking limit, the lock plate 8 which is engaged with the tooth of each ratchet gear 5 deforms each narrow hole 14 which is formed in the bottom portion 15 of each long hole 13 and projects thereinto as shown in FIG. 4. As a result, the engagement between the tooth of each ratchet gear 5 and the lock plate 8 is released. Then, the second roller 4 becomes rotatable so that the seat belt S is gradually extended from the locking device of the present invention while being strongly caught between the rollers 3 and 4.

And when the load of the occupant is continuously applied to the seat belt S, the seat belt S is finally extended by a length tightened in the reel of the emergency lock retractor.

Therefore, even if the knurling is formed in the surface of each roller in order to strengthen the locking operation thereof, there is no danger that the seat belt is broken in the strongly compressed portion thereof even upon the impact of the vehicle at high speed.

In the first embodiment, as the load limiting means for releasing the lock of the seat belt, a narrow hole 14 into which the lock plate 8 projects at a predetermined load, is provided in each long hole 13.

Instead, other embodiments are possible as the load limiting means.

Figure 5:
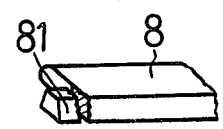
FIG. 5 is a perspective view of a main part of a second embodiment when the lock is released.

For example, in the second embodiment shown in FIG. 5, the connecting portion between the lock plate 8 and each pawl portion 81 is formed thin so as to be broken at a predetermined load.

Figure 6:
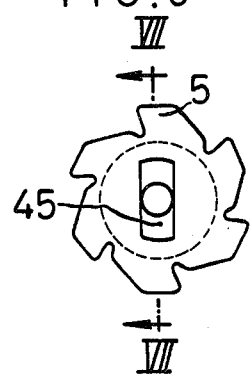
FIG. 6 is a side view of a gear portion of a third embodiment.
Figure 7:
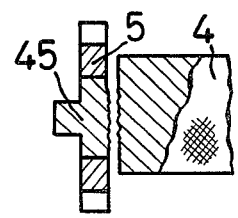
FIG. 7 is a sectional view taken along the line VII—VII of FIG. 6 when the lock is released.

In the third embodiment shown in FIG. 6 and FIG. 7, breakable portions 45 which are broken at a predetermined load are formed in both ends of the second roller 4 and the ratchet gears 5 are connected to the breakable portions 45.

As described above, the present invention relates to a seat belt locking device which is installed in the seat belt system of a vehicle together with an emergency lock retractor.

According to the seat belt locking device of the present invention, the seat belt itself is surely locked so that the seat belt is prevented from being extended out of the retractor when the load of the occupant is applied at an emergency time such as upon a vehicle impact. And even if excessively high load is applied to the seat belt, the seat belt is not in danger of being broken in the locked portion thereof.

Therefore, the seat belt locking device of the present invention contributes to the improvement of the safety of the occupant on the vehicle at an emergency time.

Having now fully described the invention, it will be apparent to one of ordinary skill in the art that many changes and modifications can be made thereto without departing from the spirit or scope of the invention as set forth herein.

What is claimed is:

1. A seat belt locking device to be installed in a seat belt system of a vehicle together with an emergency lock retractor for locking a seat belt when a seat belt winding member of said emergency lock retractor is locked at an emergency time, comprising:
    a first roller and a second roller along which said seat belt connected to said seat belt winding member of said emergency lock retractor is stretched;
    said first roller being rotatably supported at a predetermined position by a fixed member of said vehicle;
    said second roller being rotatably supported by said fixed member at a predetermined distance from said first roller in parallel therewith so as to be movable toward said first roller;
    said seat belt being stretched through the space between said first roller and said second roller so that load is applied to said first roller and said second roller in the opposed directions to each other when said seat belt is tensioned;
    a roller locking means which is provided between said fixed member and said second roller for locking said second roller when said second roller moves toward said first roller due to the load of said seat belt to strongly catch said seat belt between said first roller and said second roller at an emergency time; and
    a load limiting means which is provided in said roller locking means for unlocking said locking means when load applied to said seat belt reaches a predetermined value to prevent said seat belt from being broken.

2. A seat belt locking device according to claim 1, further comprising:
    an elastic pushing means for pushing said second roller so as to be spaced from said first roller at said predetermined distance,
    wherein:
    said fixed member comprises a pair of opposed side plates wherein a curved guide hole is formed respectively so as to be opposed to each other;
    said first roller is rotatably supported by said side plates at an end of said guide hole; and
    said second roller is rotatably supported by said side plates, pressed to the other end of said guide hole by said elastic pushing means.

3. A seat belt locking device according to claim 1, wherein:
    said roller locking means comprises:
        at least one ratchet gear which is provided at at least one end of said second roller; and
        a lock plate which is supported by said fixed member;
        said lock plate engaging with said at least one ratchet gear when said second roller moves toward said first roller to strongly catch said seat belt between said first roller and said second roller.

4. A seat belt locking device according to claim 3, wherein:
    said lock plate is provided with at least one pawl portion in at least one end thereof so as to be engageable with said ratchet gear;
    said lock plate is disposed within a long hole formed in a said side plate so as to be rotatably supported by the bottom portion of said long hole; and
    said lock plate being elastically pushed so that said at least one pawl portion thereof turns toward said at least one ratchet gear when said seat belt is strongly sandwiched between said first roller and said second roller.

5. A seat belt locking device according to claim 4, wherein:
    said load limiting means is composed of said lock plate and at least one narrow hole of a width is smaller than that of said lock plate, which is formed in said side plate from said bottom portion of said long hole;
    whereby said lock plate deforms said at least one narrow hole and projects thereinto when a predetermined load is applied to said lock plate through said at least one ratchet gear and said second roller so that the engagement between said lock plate and said at least one ratchet gear is released.

6. A seat belt locking device according to claim 4, wherein:
    said load limiting means is formed in said lock plate provided with at least one pawl portion; and
    said pawl portion is connected to the main body of said lock plate by a thin walled connecting portion which is broken at a predetermined load.

7. A seat belt locking device according to claim 3, wherein:
    said load limiting means is formed in said ratchet gear; and
    said ratchet gear is connected to said second roller by a breakable portion which is broken at a predetermined load.

* * * * *